Patented June 13, 1950

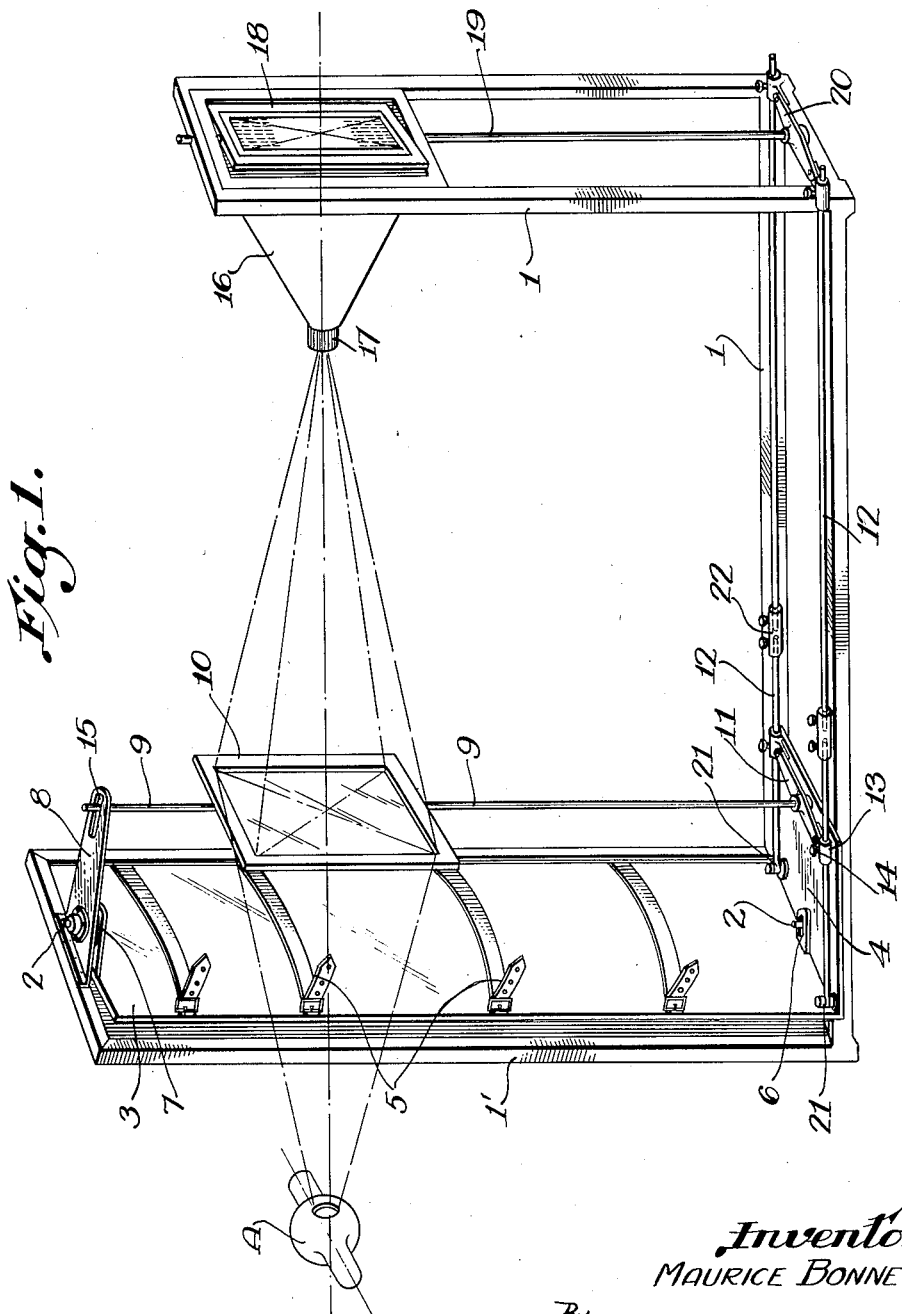

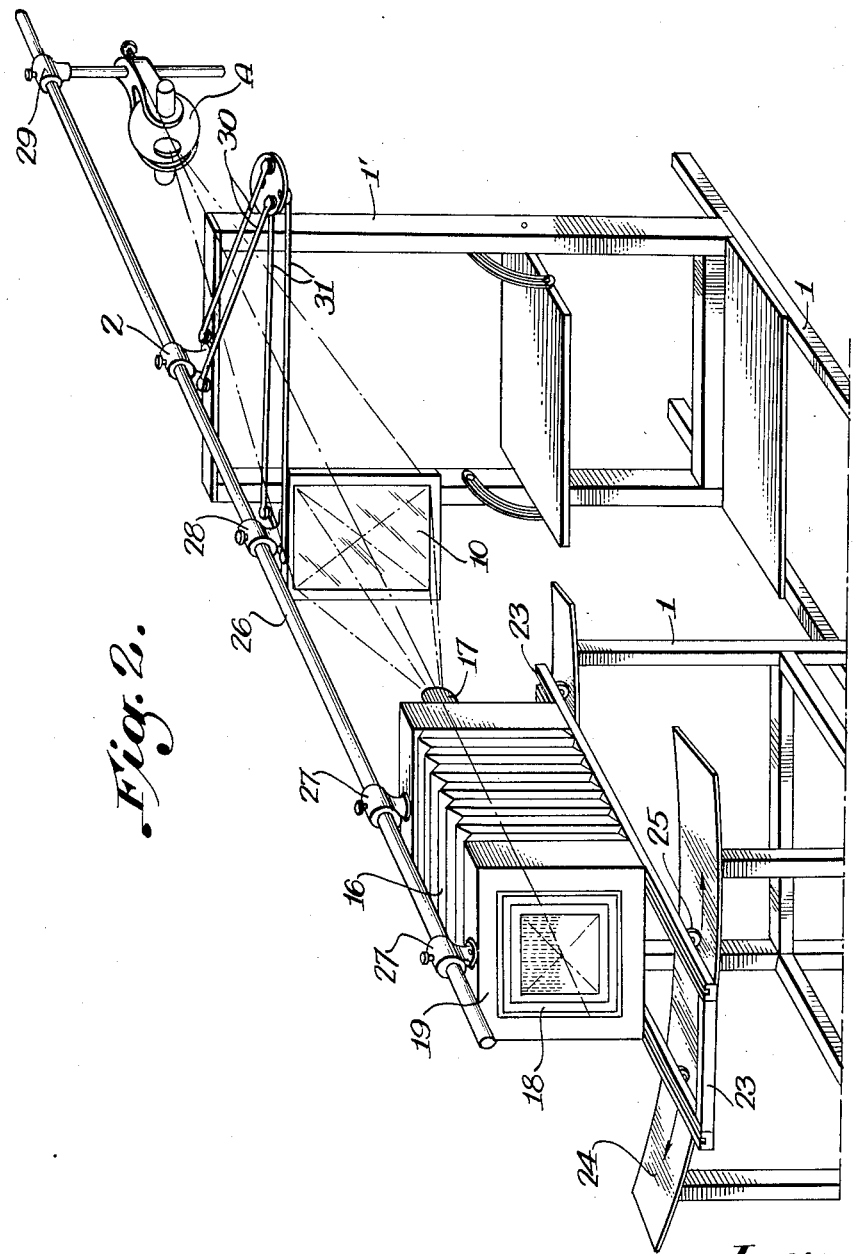

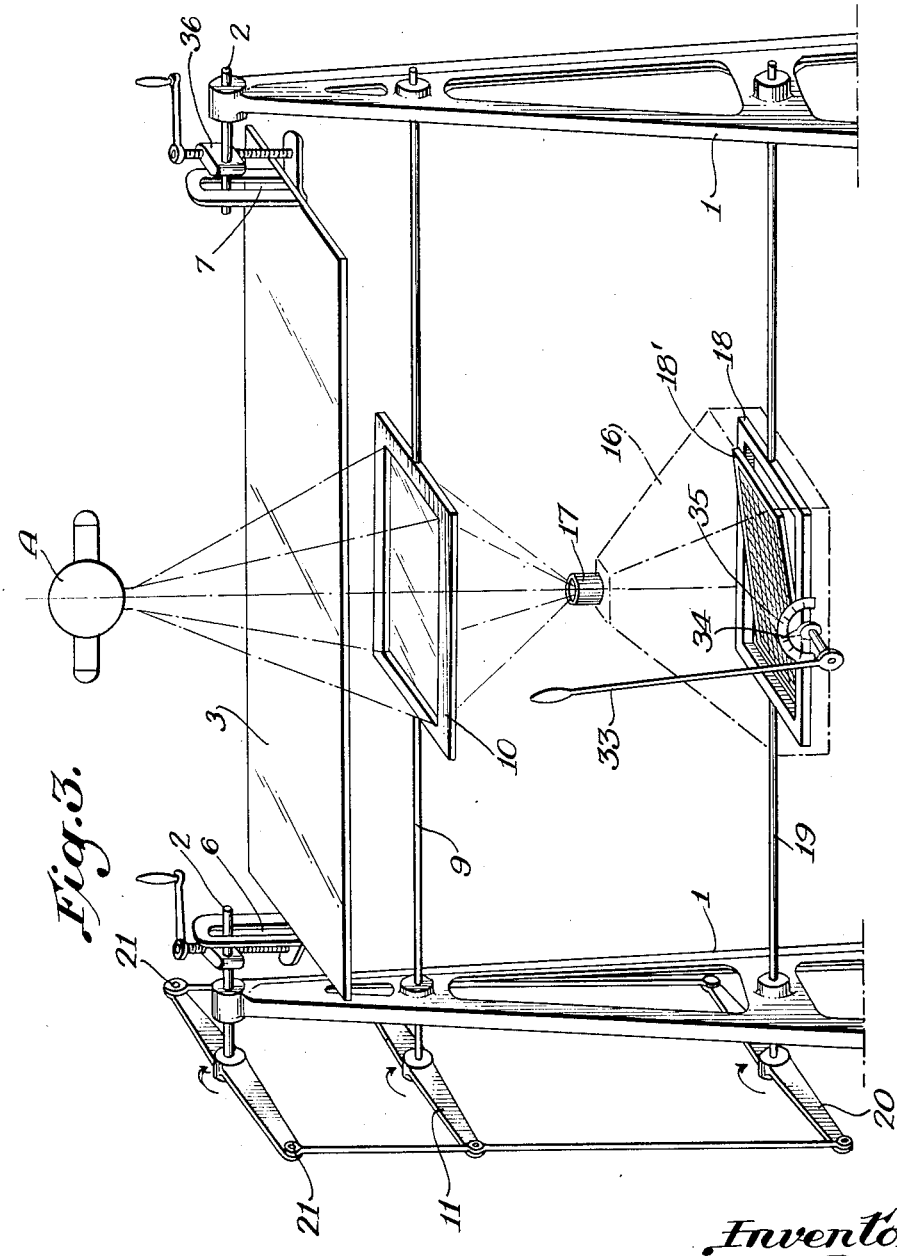

2,511,097

UNITED STATES PATENT OFFICE 2,511,097

DEVICE FOR OBTAINING X-RAY PHOTOGRAPHS IN RELIEF

Maurice Bonnet, Paris, France, assignor to La Reliephographie, Societe pour l'Exploitation des Procedes de Photographie en Relief Maurice Bonnet, Paris, France, a French corporation Application December 11, 1945, Serial No. 634,367
In France June 12, 1944

Section 1, Public Law 690, August 8, 1946
Patent expires June 12, 1964

7 Claims. (Cl. 250—65)

In order to obtain the impression of relief, when examining X-ray photographs, it is usual to examine, by means of a stereoscope, a pair of X-ray photographs taken under different angles of incidence of the beam of X-rays. This method of observation is tedious, as the user must ascertain by trial the correct position of both images on the negatoscope where the negatives are observed by transparency.

It has also been proposed to project on a photosensitive surface both radiographic negatives, constituting the steroscopic couple of images, through a grating having alternate opaque and transparent lines, so as to obtain a positive lined image which, through a known optical phenomenon, appears in relief when it is observed through an identical grating, from a distance equal to that of the position of the lenses, which served for the projection of the negatives.

It follows from the very conditions in which these two-image stereographs are obtained that they can only be observed in relief from very well defined points in space. Moreover, they are only capable of giving the perspective of the subject seen from a single point of view, which allows of only a very imperfect impression of relief being obtained.

On the other hand, it is known that recordings of radioscopic images can be obtained by photographing, and even by filming the so-called "fluorescent" image which appears on the radioscopic screens. But said image is of a very reduced luminosity, and it consequently requires either very long time-exposures, inconsistent with the X-raying of a living subject, or the use of lenses of very large aperture, difficult to produce and in any case very costly, especially if the X-ray photograph is to be directly obtained of a large size, that is to say, capable of being immediately used.

The present invention provides means for obtaining radiographic images observable in relief by reflection, that is to say, without its being necessary to illuminate them from the rear. The taking of said X-ray photographs by the means forming the subject-matter of the invention, and which is effected by photographing the radioscopic screen allows of lenses of small aperture being used, without the time-exposure being thereby extended. Further, the images obtained by said new means have also the characteristic feature that they can be examined not only from predetermined points in space, but over an area which is comparatively extended in width and very extended in depth; the transverse movements of the observer, within the limits of the observation base thus created, give him the impression that he is turning round the X-rayed subject, owing to the fact that through his movements, he produces relative displacements between more or less distant elements or points of the objects observed.

This improvement in the conditions of observation in relief is of considerable importance, especially in the particular case of radiological observation, as it allows of perfectly locating in depth the various details of the image.

The invention mainly relates to a method of obtaining X-ray photographs in relief, or selectoradiographs by taking a photograph of the fluorescent image appearing on the radioscopic screen, one main feature thereof consisting in the use, when recording, of an optical selective grating having refringent lenticular elements which are either cylindrical, or spherical, or cylindrical and crossed at 90°, placed against and in front of the sensitive surface. Another feature consists in the introduction of a kinematic factor in the actual static arrangement of the elements of the fourfold group which co-operate for obtaining radiographs by taking a photograph of the screen, viz. the Röntgen lamp, the subject to be X-rayed, the fluorescent screen and the photo-sensitive surface.

It is this combination of a relative movement of the elements referred to with the action of a recording lenticular selector, or selectograph, that secures the advantages of the selectoradiographs obtained according to the invention. In fact, the properties of the selectograph have in this case a very advantageous action, as regards both a gain in luminosity, as applied to the fluorescent image, the brilliancy of which cannot be increased, and a selective action, which allows of effecting a continuous succession of recordings, without the help of a shutter, said continuity being alone capable of ensuring the "modelling" of the image obtained.

The invention also relates to apparatus suitable for carrying out the method above defined, as well as to the selectoradiographs of particular type obtained by means of these apparatus, and having the properties mentioned.

The accompanying drawings illustrate, by way of example, three different constructions of the apparatus.

In all the figures, the same reference numbers have been used to designate equivalent members, that is to say, having the same function.

In Figure 1, 1 is the fixed frame of a first selectoradiographic apparatus, the rear frame 1' of which carries in the plane of the vertical axis thereof, two journals 2, on which pivots the unit constituted by the bearing panel 3 and the platform 4 on which the patient is placed. Suitable devices such as straps, shown by way of example, allow, if necessary of holding the subject fixed in the apparatus, in order to ensure the utmost sharpness in the X-ray image.

Slide-ways 6, 7, each of which is associated with a control mechanism (not shown) of any desired construction, for instance, of the type shown at 36 in Figure 3, allow of varying the distance between the axis 2—2 and the bearing plane of panel 3, in order to adjust the position of the subject to be photographed, for the purpose hereinafter described.

At the end of a stationary arm 8 there is journalled a shaft 9 to which the radioscopic screen 10 of known type is secured. The lower end of the shaft 9 is secured to a swing-bar 11, adapted to slide along two horizontal rods 12, by means of pivoted end sleeves 13, which can be secured in position by screws 14.

The shaft 9 is also movable in a slide-way 15 of the arm 8, which is provided, if necessary, with a device similar to 36 in Figure 3. Owing to the assembly just described, the distance between the radioscopic screen 10 and the axis 2—2 can be altered as desired.

Opposite the screen 10 is fixedly mounted in position a photographic camera 16, provided with a lens 17.

Owing to the properties of the optical selector used for taking the view, properties indicated in particular in my co-pending U. S. A. patent application No. 634,369 filed Dec. 11, 1945, for "Combination of a lens and a lenticular selector for the recording and reconstitution of photographic images, in particular of multiple images on a single negative," the lens 17 may be given an aperture much smaller than those hitherto used, without its slight luminosity affecting the rapidity of the recording.

In the rear part of the photographic camera 16, there is pivotally mounted a frame 18 in which is placed a special plate-holder to receive the photo-sensitive surface and the optical lenticular view-taking selector or selectograph. Said plate-holder is described in my co-pending U. S. A. patent application, No. 640,014 filed Jan. 9, 1946, now abandoned, for "Negative plate-holder with curtain, for taking negatives of lined photographs, in particular peri-stereoscopic images." The frame 18 is secured to a vertical shaft 19, at the lower end of which is secured a swing-bar 20, pivoting at the end of rods 12. The latter are pivoted at their opposite end to journals 21 of platform 4. Owing to the longitudinal displacements provided for the bearing panel 3, said rods are made of variable length, and each of them is provided for this purpose, for instance, with a connection sleeve 22 provided with a fixing screw. They may also be arranged to slide in the swing-bar 20, which would then be provided with similar sleeves as the swing-bar 11.

The above device is, of course, used in combination with a Röntgen lamp diagrammatically illustrated in the figure, and supported in a known manner, as in usual radiological apparatus.

The operation of the device hereinbefore described is as follows:

With the selectograph forming a characteristic element incorporated in the fourfold group above defined, there is associated a separate pivotal movement of three of the elements of the group, the fourth remaining stationary. In this first form of construction, the subject, the screen 10 and the frame 18, all pivot round their own vertical axis, through one and the same angle during the view-taking, and so as to always remain parallel to each other. The amplitude of said pivotal movement is normally equal to the aperture angle of the lenticular elements of the selectograph. As regards the Röntgen lamp, it remains stationary.

During the recording, the fluorescent image on the screen 10 has an appearance which varies gradually at the same time as the inclination of the subject is changed with respect to the direction of the beam of X-rays. This revolving image is gradually recorded on the sensitive surface, behind the selectograph, in the form of image elements inserted one between the others and corresponding to the successive aspects of the fluorescent image, during the rotation of the subject.

When this compound image, once developed, is examined through a selective grating, or selectoscope, similar to the view-taking selectograph, the visual rays corresponding to both eyes of the observer meet by virtue of the refringent properties of the lenticular elements of the selectoscope, image elements which correspond respectively to two different angular aspects of the subject, and therefore the selectoradiograph appears in relief.

The pivotal movement of the screen 10 is necessary in order to avoid a distortion of the image, in the extreme angular positions. However, in cases in which said distortion may be considered negligible, the apparatus may be simplified by providing it with a non-pivoting screen 10.

It is easy to convert the horizontal apparatus illustrated in Figure 1 into an apparatus having a vertical axis.

Figure 2 shows a second embodiment, the principle of operation of which is identical with that of the construction illustrated in Figure 1, but in which the relative angular movement of the constituent elements of the apparatus forming the four-fold group previously mentioned, is obtained by other means.

In this example, the subject to be X-rayed is placed in the frame 1' of the main frame 1 and, in contradistinction to that which takes place in Figure 1, it remains stationary during the recording. In this case, it is the Röntgen lamp A, the radioscopic screen 10 and the entire photographic chamber 16, which effect a displacement along an arc of a circle, round the axis 2.

The frame 23 of the camera rolls on guiding tracks along an arc of a circle 24, by means of rollers 25 set to move in the required direction. Through the action of a known mechanism, the plate-holder-carrying frame 18 always remains parallel to itself and parallel to the frame 1', by pivoting round the journals 19 during the movement of the camera 16 through an arc of a circle.

An arm 26 is rigidly secured to the front and rear parts of the camera 16, by means of sleeves provided with fixing screws 27. The radioscopic screen 10 is in its turn, adjustably mounted along the arm 26, by means of a sleeve with fixing screw 28; and a similar sleeve 29 allows of adjusting the position of the lamp A on the end of the arm 26 which extends beyond the pivot 2.

If it is considered necessary to ensure a constant parallelism between the screen 10 and frame 1', these two members are connected through a suitable expansible parallel motion device constituted by a first parallel motion linkage 30, to the end of which is pivoted a second parallel motion 31. Said device allows of the screen 10 being moved relatively to the frame 1' without the parallelism of both said members being affected by changes in their spacing.

Of course, the frame 1' may be provided with all the suitable accessories which will allow of comfortably settling the patient to be X-rayed. The screen 10 can also be arranged to be vertically adjustable.

The operation of this second construction is as follows:

The subject to be X-rayed being placed in the frame 1', the peri-stereoscopic camera 16 is set in motion to effect its recording stroke from one end to the other of its rolling tracks 24, thus following an arcuate path with the pivot 2 as a centre. The arm 26 causes at the same time the screen 10 and the lamp A to partake in said arcuate movement, which causes, as in the construction shown in Figure 1, the appearance on the screen 10 of successive images which correspond to aspects of the subject seen under gradually varying angles. The recording on the photo-sensitive surface effected under these conditions presents the same features as that obtained with the apparatus shown in Figure 1.

Also in this case the axis of the apparatus may be arranged vertically without departing from the scope of the invention.

Figure 3 illustrates an X-ray table the operation of which is identical with that of the above devices, so that it is not necessary to describe the general arrangement thereof in greater detail. All the members common to the two first embodiments are to be found in this figure.

However, in this case the selectograph is always of the type having spherical lenticular elements or else cylindrical elements crossed at 90°, in order to produce image elements in the form of points, and the frame 18', in which is placed the special plate-holder containing this selector and the photo-sensitive surface, is capable of effecting, after each view-taking, a pivotal movement round a spindle 32 perpendicular to the spindle 19. Said movement is controlled, for instance, by a lever 33, and indicated on a graduated sector 34 by means of an index 35. The pivotal movement of the selectograph and the photo-sensitive surface round the spindle 32 allows of recording on the latter a plurality of distinct X-ray photographs, this being an application of the particular properties of crossed gofferings set forth in the first of the co-pending patent applications above-mentioned.

This possibility of recording several distinct X-ray photographs on one and the same negative, the time of development of which is the same as that of a single X-ray photograph, offers, in addition to the important economy in sensitive surface thus obtained, considerable advantages in the radiological art. The dispensing with all manipulations of slides, between the recording of the successive views, allows of ensuring an appreciable saving of time.

For the purpose of examination, the developed multiple negative is observed through a selectoscope of the same type as the selectograph which served for its recording. By simply moving his head vertically—or by inclining the image round an horizontal axis—the observer will successively see the various X-ray photographs, which have been recorded on one and the same negative, and they will appear in relief. The soundness of the practitioner's diagnosis can be appreciably increased by this comparative examination of multiple X-ray photographs, corresponding, for instance, to a succession of different incidence of the beam of X-rays.

The freedom of movement of the bearing panel of Figure 1, or of the table of Figure 3, relatively to the pivotal axis 2 allows of displacing, to a certain extent, the subject relatively to the plane of the image obtainable. In fact, the parts of the subject located in front of the pivot 2 relatively to the screen 10 will appear in front of the plane of the image and, vice versa, the parts of the subject located beyond the pivot 2 relatively to the screen will seem to be beyond the plane of the image. Now, it may be an advantage to cause the plane of the image to coincide with a well determined plane of the subject, and the slideways 6, 7, associated with the mechanism 36, allow this very adjustment to be effected. Said device thus allows of choosing at will the main plane of the selectoradiograph.

So far, mention has been made only of a pivotal movement of the selectograph and of the photo-sensitive layer, in order to obtain the selection of the successive images, said movement corresponding to the relative angular displacement obtained between the subject and the direction of the beam of X-rays. However, it is also possible, without departing from the scope of the invention, to substitute for said angular movement, a sliding movement of one of the said two elements relatively to the other, which movement is obtained in the known manner, and ensures, as is well known, the same selective action as the angular movement referred to.

The negatives obtained by means of the three different apparatus described and illustrated have a common feature namely, that they contain a plurality of images, the elements of which are either lined, or punctiform, and are always interposed between each other. Said negatives have the property of being visible in relief along a certain observation "base," when they are covered with a selectoscope, that is to say, with a suitable observation screen, and supply an image in perfect relief of the X-rayed subject, viz. an image the appearance and perspective of which are evolved as in reality, when the observed moves transversely in front of the image.

The negatives obtained as just explained, may be printed by contact, in the usual manner, in order to supply positive proofs also observable with the same relief, when they are covered with a selectoscope. Said proofs can be obtained either on glass plates, in order to give transparent images, or on paper, to supply images observable by reflection.

It is to be understood that the characteristic features hereinbefore described and illustrated with reference to some of the constructions may be incorporated in any of the others, and that the constructions may be modified in various ways without departing from the scope of the invention.

Having now particularly described and ascertained the nature of my said invention, and in what manner the same is to be performed, I declare that what I claim is:

1. An apparatus for producing radiographic relief pictures, comprising a stationary X-ray tube, a rocking support for the subject to be X-rayed, a fluorescent screen, a photosensitive surface, a selective grating rigidly carried by said surface and constituted by adjacent cylindrical lenses, means for focusing the fluorescent picture on to the photo-sensitive surface, and stationary axes parallel to the axes of the lenses and round which the support and the photo-sensitive surface are respectively adapted to pivot in unison during the view-taking.

2. An apparatus for producing radiographic relief pictures, comprising a stationary X-ray tube, a support for the subject to be X-rayed, a fluorescent screen, a photosensitive surface, a selective grating rigidly carried by said surface and constituted by adjacent cylindrical lenses, means for focusing the fluorescent picture on to the photosensitive surface, and axes parallel to the axes of the lenses and round which the support, the screen and the photosensitive surface are respectively adapted to pivot during the view taking.

3. An apparatus for producing radiographic relief pictures, comprising a stationary X-ray tube, a support for the subject to be X-rayed, a fluorescent screen, a photosensitive surface, a selective grating rigidly carried by said surface and constituted by adjacent cylindrical lenses, means for focusing the fluorescent picture on to the photosensitive surface, three stationary axes parallel to the axes of the lenses and round which the support, the screen, and the photo-sensitive surface are respectively adapted to pivot during the view taking, and a parallel motion system coupling the support, the screen, and photo-sensitive surface, and constraining said support, screen, and photo-sensitive surface to remain constantly parallel to one another.

4. An apparatus for producing radiographic relief pictures, comprising a stationary X-ray tube, a support for the subject to be X-rayed, a fluorescent screen, a photosensitive surface, a selective grating rigidly carried by said surface and constituted by adjacent cylindrical lenses, means for focusing the fluorescent picture on to the photo-sensitive surface, three stationary axes parallel to the axes of the lenses and round which the support, the screen and the photosensitive surface are respectively adapted to pivot during the view taking, a parallel motion system coupling the support, the screen, and photo-sensitive surface and constraining said support, screen and photosensitive surface to remain constantly parallel to one another, and means for adjusting the length of the parallel motion connecting the support with the screen.

5. An apparatus for producing radiographic relief pictures, comprising a stationary X-ray tube, a support for the subject to be X-rayed, a fluorescent screen, a photosensitive surface, a selective grating rigidly carried by said surface and constituted by adjacent cylindrical lenses, means for focusing the fluorescent picture on to the photosensitive surface, three stationary axes parallel to the axes of the lenses and round which the support, the screen and the photosensitive surface are respectively adapted to pivot during the view-taking, and means for adjusting the distance between the support and the pivoting axis thereof.

6. An apparatus for producing radiographic relief pictures, comprising an X-ray tube, a stationary support for the subject to be X-rayed, a fluorescent screen, a photosensitive surface located in a photographic camera which comprises a lens for focusing the fluorescent picture onto said photosensitive surface, a selective grating, rigidly carried by a pivoted frame supporting said photosensitive surface, an arm rigidly secured to the camera in parallelism with the optical axis thereof, a vertical frame rigid with the support, means whereby said arm is adapted to rock in a plane substantially perpendicular to said frame, means whereby the screen is longitudinally slidable over and secured to said arm, and means whereby the X-ray tube is longitudinally slidable over and secured to the arm beyond the frame with reference to the screen and camera.

7. An apparatus for producing radiographic relief pictures, comprising an X-ray tube, a stationary support for the subject to be X-rayed, a fluorescent screen, a photosensitive surface located in a photographic camera which comprises a lens for focusing the fluorescent picture onto said photosensitive surface, a selective grating rigidly carried by a pivoted frame supporting said photosensitive surface, an arm rigidly secured to the camera in parallelism with the optical axis thereof, a vertical frame rigid with the support, means whereby said arm is pivotally secured to said frame, means whereby the screen is longitudinally slidable over and secured to said arm, means whereby the X-ray tube is longitudinally slidable over and secured to the arm beyond the frame with reference to the screen and camera, and connecting links of adjustable length pivotally connecting the screen with the stationary frame and adapted to keep said screen parallel with said frame during the rocking of the arm.

MAURICE BONNET.

REFERENCES CITED

The following references are of record in the file of this patent:

UNITED STATES PATENTS

| Number | Name | Date |
|---|---|---|
| 2,029,300 | Arfsten | Feb. 4, 1936 |
| 2,110,953 | Grossmann | Mar. 15, 1933 |
| 2,353,145 | Chamberlain, Jr. | July 11, 1944 |

FOREIGN PATENTS

| Number | Country | Date |
|---|---|---|
| 449,213 | Great Britain | June 23, 1936 |
| 554,699 | Great Britain | July 15, 1943 |